Aug. 14, 1956 R. E. ROGERS ET AL 2,758,567
LIQUID FLOW CONTROL APPARATUS
Filed Jan. 27, 1954

INVENTORS.
RAYMOND E. ROGERS
DAVID C. KING
BY
ATTORNEY

# United States Patent Office 2,758,567
Patented Aug. 14, 1956

2,758,567

LIQUID FLOW CONTROL APPARATUS

Raymond E. Rogers and David C. King, Denver, Colo.; said King assignor to said Rogers Application January 27, 1954, Serial No. 406,472

13 Claims. (Cl. 119—157)

This invention relates to the control of the flow of liquids and more particularly to the control of liquids where such is contained in a large storage space and desired to be used in a continuous uniform small quantity for a given period of time. Our liquid flow control apparatus has been primarily designed for a timed control of the flow of a liquid insecticide from a storage tank to a suspended applicator level where it can be automatically transferred to livestock by a wiping action as the animal moves beneath the applicator, but it is to be understood that the invention's use is not so limited as it can be used in any place where this type of liquid flow control is desired.

One of the objects of our invention is to produce an improved timed liquid flow control apparatus of the gravity type by the employment of a member having a small bore such as a capillary tube.

A further object is to produce a liquid flow control device of the kind above referred to which will be so constructed that the rate of flow through the small bore member can be made to be uniform for all practical purposes while dispensing any quantity of liquid from a storage supply.

A still further object is to so make the construction of the flow control device that the rate of flow being controlled can be readily changed for each device by a change in the tubular member either as to length of bore, diameter of bore or both, or by other means not involving a change in either the diameter of the bore or its length.

Another object is to so construct a liquid flow control device of the kind referred to that a filtering of the liquid will be accomplished before the liquid passes by gravity through the control tube bore.

Yet another object is to so construct the tubular member and associate with a casing that a sediment trap will be provided which will aid in preventing clogging of the tube bore.

Other objects of the invention will become apparent from the following description taken in connection with the accompanying drawings in which:

Figure 1 is a view of an insecticide applicator apparatus for livestock which employs a liquid flow control apparatus embodying our invention and being positioned between the storage tank for the liquid and the applicating fabric or like device;

Figure 2 is an enlarged view showing the flow control apparatus positioned in a marginal part of the fabric;

Figure 3 is a longitudinal sectional view through the control apparatus showing details of construction; and Figures 4, 5 and 6 are sectional views of other constructions also embodying our inventon.

Referring to the drawings and first to Figures 1, 2 and 3, one form of our liquid flow apparatus is illustrated as associated with a liquid insecticide applicator, generally indicated at A, for livestock whereby the insecticide can be fed in a time controlled manner and by gravity alone to the applicator in the proper quantities to accomplish the transfer of the desired amount of insecticide to livestock without any waste. The association of the flow control apparatus with the insecticide applicator is to be considered as illustrative only as the flow control apparatus may be employed wherever it is desired to obtain an accurate time controlled feed by gravity over the flow of small quantities of a liquid to any place where it is to be used.

The applicator illustrated in Figure 1 is the type which is to be mounted in a place where animals desired to be treated with the insecticide normally walk so that as they move past such place, application of the insecticide will take place. An example of a suitable place for mounting the applicator would be at a gate leading to a water hole or salt ground which would be fenced in. The applicator has a main portion made of fabric netting 10 or other suitable open mesh material. This netting is arranged to be hung from any cross member such as the rod 11 attached at its ends to posts 12 and 13 forming the gate through which the livestock moves. The two ends and the bottom of the netting have sewed or otherwise attached thereto suitable border fabric material for holding and conveying the insecticide which is to be applied to the livestock. The end and bottom borders are indicated in Figure 1 by the numerals 14, 15 and 16. A suitable material for these borders could be canvas or some other strong fabric which will enclose an absorbent material such as wicking or the like, capable of absorbing liquid in considerable quantities. The bottom border 16 will preferably be inclined toward one end so as to permit a gravity and/or capillary movement of the liquid from the right hand end to the left hand end as viewed in Figure 1. As illustrated, there is also provided at the widest or left end of the applicator A a downwardly hanging piece of material 17 which will be constructed in the same manner as the borders. The purpose of this hanging piece 17 is to provide a member soaked with insecticide to drag along the lower portions of an animal's body and cause the insecticide to be applied to these parts while at the same time the back is having applied thereto insecticide from the bottom border 16 being dragged over the animal's back. The bottom of the applicator will be positioned at such a height off the ground that an animal can lower its head and then pass thereunder with the bottom border being dragged over the animal's back.

The insecticide to be conveyed to the applicator is preferably placed in a container or storage tank T elevated above the applicator A, a suitable place being on top of the post 13 having a bracket 18 for holding the tank. The bottom of the tank is provided with an outlet orifice 19 to which is connected a conductor tube 20, preferable flexible and made of rubber, synthetic rubber or plastic. This tube extends downwardly to the applicator and has attached at its lower end our improved flow control apparatus indicated generally by the letter F. The flow control apparatus is shown in the right hand end border 15 which is below the tank on post 13. The position of the flow control apparatus in the border will be between the canvas layers 21 of the border and in the absorbent wick material 22 which is covered by the canvas material, all as illustrated in Figure 2.

In the flow control apparatus F which is illustrated in detail in Figures 2 and 3, there is provided a bottom tubular metal member 23 and a top tubular metal member 24, with the top member being preferably slightly smaller in diameter than the lower member, but it can be the same diameter if desired. Within the bottom member is positioned an elongated flow control element 25 which, as shown, has a cylindrical outer surface, the diameter of which is somewhat less than the diameter of the tubular member 23. Through this element 25 is a small capillary bore 26 for controlling the rate of flow of the insecticide which is to be dispensed from the storage tank. To provide a seal between the control element 25 and the tubular member 23 there is provided a gasket sleeve 27 which can be made out of any suitable material such as rubber, synthetic rubber or plastic, preferably a material which is capable of not being damaged by the chemicals in the insecticide. To assure that the gasket will provide a good seal between the control element 25 and the tubular member 23, the latter is formed with annular grooves 28 which will press inwardly on the gasket sleeve and hold it in tight engagement with the outer surface of the control element. The gasket material is positioned preferably some distance below the top end of the control element so as to establish an annular chamber surrounding the upper end of the control element in which fluid can accumulate. The upper end of the control element is of a special construction to produce an end of reducing cross sectional area as the inlet of the bore is approached. Preferably, as shown, this is accomplished by a conical surface 29 with the apex end of the surface at the inlet of the capillary bore. The purpose of this conical end is to facilitate the preventing of any foreign material or sediment which might be in the insecticide from entering the capillary bore and cause clogging. With the conical end, any insecticide coming down to the flow control apparatus will have substantially all of any foreign material therein strike the conical surface and be deflected so as to settle into the annular chamber surrounding the upper end of the control element 25. In place of the use of a conical end at the tube inlet, other arrangements of the inlet end of the capillary bore can be used, such as a curved end with a side inlet or the use of side feeding opening into the capillary bore.

The two tubular members 24 and 23 are suitably attached together during assembly and the joint is preferably made with the upper end of the control element extending into the lower end of the upper metal tubular member 24. This upper tubular member carries a filter screen 30 which is preferably so constructed as to be an inverted cone. The screen is very fine and the purpose is to catch pieces of foreign material which might be carried by the insecticide from the storage tank to the flow control apparatus. The upper end of the inverted conical filter is provided with a small flange 31 for securement to the top edge of the tubular member 24. To connect the control apparatus to the conducting tube 20 coming from the storage tank, the upper tubular member 24 is merely inserted into the lower end of the tube 20. A good seal will be obtained by having the internal diameter of the tube 20 slightly smaller than the external diameter of the tubular member 24.

In order to have an additional guard against the posibility of foreign material reaching the capillary bore of the control element 25, the inlet end of the tube 20 coming from the storage tank can also be provided with a filter screen 32 of small mesh, all as shown in Figure 1. The terminal end of the tube 20 which is attached to the outlet orifice of the tank may also be caused to project upwardly somewhat into the tank so it will be above normal settlement of foreign material in the bottom of the tank.

In producing our flow control apparatus, the control element 25 which may be made of glass or other suitable material such as plastic is first mounted in the tubular member 23 and then sealed therein by "rolling in" the annular grooves in the outer surface of the tubular member 23. The particular control element which will be mounted in the tubular member 23 will be precalibrated so there will be the desired amount of insecticide passed to the applicator for proper pest control. If the applicator is to apply insecticide to a large number of animals, then of course the control of the flow of the insecticide from the storage tank will have to be such as to allow for a volume of insecticide to reach the applicator that each animal will receive sufficient insecticide to give proper pest control. If a much smaller number of animals are to have insecticide applied thereto, then a different control will have to be used for the rate of flow of insecticide to the applicator. The rate of flow can be accomplished by changing the diameter of the capillary bore, by changing the length of the control element, or by a combination of the two.

After the control element 25 is inserted and sealed in the member 23, with the upper end of the control element being above the sealing gasket to establish the sediment collecting chamber, the upper tubular member 24 is attached to the top end of the tubular member 23, as by soldering. Before attaching the upper tubular member 24, the filter screen can be mounted therein or, if desired, it could be mounted after the two tubular members are attached together.

If desired, the feeding of the liquid into the end border 15 may be further controlled by having the tubular member 23 provided at its lower end with a closure 33 provided with a small orifice 34. There is also the possibility during operation of the flow control apparatus that an "air lock" might develop. In order to easily break this air lock without wasting insecticide, the tubular member 24 can be provided with a small opening 35 in its wall near its upper end and opposite the filter screen. This hole will be normally covered by the conductor tube 20. To eliminate the "air lock," all that needs to be done is withdraw the flow control member sufficiently from the end of the conductor tube 20 to expose the hole 35 and allow air to escape the tubular member 24, after which the hole can be again covered by pushing the tubular member upwardly into the conductor tube.

With our flow control apparatus shown and described, it will be possible to obtain a very efficient control of the rate of flow of insecticide to the applicator for any number of animals to be serviced so as to efficiently prevent them from being bothered by various pests, etc. Also, by providing the right size of tank, the insecticide can be applied to the animals over a very extended period of time without the necessity of checking on the supply available. Thus, the applicator can be placed at a remote place and there will be assurance that the animals are being properly serviced with insecticide, all in an automatic manner. The conductor tube 20 for attaching the flow control apparatus with the tank should be of considerably greater length than the height of the tank as change in the height of insecticide in the tank will then have little effect upon changing the rate of flow because of varying gravity head. This is obvious because the change in head from a filled tank to an empty tank will only be a small percentage of the head (including long conductor tube) which will be at all times effective on the flow control apparatus.

In Figure 4 there is disclosed another form of flow control apparatus which is generally indicated by the letter $F^1$. In this apparatus the metal tubular member 23 is replaced by a rubber or synthetic rubber or plastic tube 36 which will receive the metal tubular member 24 in one end, this tubular member carrying the conical filter screen 30, already referred to, and being connected to the lower end of the conductor tube 20 from the supply tank. Within the tube 36 is the flow control element 25 having the capillary bore 26. This flow control element is of smaller external diameter than the internal diameter of tube 36 in order to provide for the annular sediment collecting chamber. The control element 25 is suitably sealed to the tube 36 by a gasket sealing means 37 which may be of any suitable yieldable material having a slightly larger external diameter than the internal diameter of the tube. To form this sealing gasket, even a suitable tape can be wrapped around the tube 25. The operation of the modified control apparatus $F^1$ is the same as the control apparatus F already described.

Figure 5 illustrates another form of flow control apparatus which is indicated generally by the letter F². This apparatus will have the rubber, synthetic rubber or plastic tube 36 and within which will be positioned the flow control element 25'. Above the tube will be the tubular member 24 connected thereto in the same manner as illustrated in Figure 4. In the F² construction, the flow control element 25' is of an outer diameter to fit snugly into the tube 36 and in order to create the desired seal, the external surface of the control element is formed with an annular rib or bead 38 which, when the element is inserted in the tube, will expand the tube at the bead and obtain the sealing action. In this F² form of the control apparatus there is not provided any annular sediment collecting chamber around the upper end of the control element, but the control element is provided with a conical end 29' which will assure that all foreign matter will be prevented from entering the inlet of the capillary bore 26' unless a particle should accidentally fall directly on top of the bore inlet. The capillary bore 26 is formed larger than the capillary bore in the elements 25 previously described and the purpose of this is to provide for the reception of a small flow control wire 39 into the bore. Thus, the rate of flow through the bore 26 can be varied by changing the diameter size of the wire which is to be inserted. This type of control will permit the bores of all the control elements to be of uniform diameter and whenever it is desired to change the rate of flow, it can be done by merely changing the size of the wire which is to be inserted into the bore. Of course, the control can also be varied by changing the length of the control element 25'.

In Figure 6 there is illustrated still another form of control apparatus, generally indicated by the letter F³. As illustrated, there is provided a tube 40 made of rubber, synthetic rubber or some other suitable material such as plastic. This tube has a lower closing end 41 provided with a small orifice 42. Positioned in the tube 40 is the control element 25 having the capillary bore 26 and being provided with a conical upper end 29. The internal diameter of the tube 40 will be slightly smaller than the external diameter of the control element so that when the control element is inserted into the tube from either end thereof there will be a sufficiently tight engagement between the walls thereof that a good seal will result. The control element 25 will be positioned at a point relatively close to the lower end of the tube 40 to thereby leave a place above the control element into which a filter screen 43 can be positioned. This filter screen can be made in the form of a drum with screening material at its ends. With this type of construction, the screen and the control element will all be carried by the single tube 40. To provide a simple and cheap connection between the upper end of the tube 40 and the conductor tube 20 coming from the supply tank, a small metal sleeve 44 can be employed, this sleeve having slightly enlarged ends thereon so as to accomplish a good seal with the upper end of the tube 40 and the lower end of the conductor tube 20 when it is inserted in these two tubes.

From the foregoing description it is believed to be apparent that we have conceived a very efficient gravity type of timed flow control apparatus for liquid, particularly when it is desired to control the flow of liquid at a very small rate over long periods of time and yet permit ready change of the flow control apparatus so that the flow can be varied within limits to take care of different conditions. The user of the apparatus embodying the invention will know definitely the amount of liquid being dispensed for any period of time. The apparatus assures a measuring of the quantity of liquid dispensed for long periods of time. We are aware that various modifications are possible in the particular flow control apparatus disclosed by way of example as embodying our invention and, therefore, we desire it to be understood that the invention is not to be limited in any manner except in accordance with the structural terms of the appended claims and the equivalents.

What is claimed is:

1. Liquid insecticide dispensing apparatus for livestock and the like comprising a suspended applicator of flexible material under which livestock can pass and be wiped thereby with insecticide, an insecticide supply means and conduit means connecting the supply means with the applicator and flow control means associated with the conduit means for controlling and restricting the flow of insecticide so that the insecticide can be dispensed to the applicator in a continuous manner over a predetermined time and at a slow uniform rate involving small quantities, said flow control means comprising a hollow member, a second member positioned in the hollow member and sealed to the walls thereof, said second member having a capillary bore therethrough and its end toward the supply means having a gradually reduced cross sectional area from a point spaced from said end to the end, the inlet of the bore being at said end.

2. Liquid insecticide dispensing apparatus for livestock and the like as defined in claim 1 in which the hollow member is tubular and the second member has a cylindrical outer surface with its end toward the source of supply being conical with the inlet of the bore at the apex thereof.

3. Liquid insecticide dispensing apparatus for livestock and the like as defined in claim 1 together with a fine screen filter positioned ahead of the inlet in the member having the capillary bore.

4. Liquid insecticide dispensing apparatus for livestock and the like as defined in claim 2 in which the tubular member is of metal and the second member with the capillary bore is of hard material and the sealing is accomplished by the employment of an annular yieldable member positioned between the tubular member and the second member and the metal tubular member circumferentially pressed into the yieldable member.

5. Liquid insecticide dispensing apparatus for livestock and the like as defined in claim 1 in which the hollow member extends below the second member and is provided with an outlet orifice having an area only a small fraction of the cross sectional area of the hollow member.

6. Liquid insecticide dispensing apparatus for livestock and the like as defined in claim 3 in which the screen is of a conical shape with the apex thereof being pointed in the direction of the flow of liquid through the screen.

7. Liquid insecticide dispensing apparatus for livestock and the like as defined in claim 4 in which there is provided another metal tubular member secured to the first tubular member forwardly of the said second having the capillary bore, and a fine filter screen carried by the said other metal tubular member.

8. Liquid insecticide dispensing apparatus for livestock and the like as defined in claim 1 in which the hollow member is a tube of rubber material.

9. Liquid insecticide dispensing apparatus for livestock and the like as defined in claim 1 in which the bore of the second member has a replaceable rod positioned therein and being of a diameter smaller than said bore so that the rate of flow through the bore can be varied at will by inserting rods of varying sizes.

10. Liquid insecticide dispensing apparatus for livestock and the like as defined in claim 1 in which the hollow member is a tube made of rubber material and the second member is a cylindrical member, the outer diameter of which is slightly larger than the inner diameter of the rubber tube and is provided with an annular ridge so as to expand the rubber tube appreciably and assure a tight seal when the said second member is positioned in the rubber tube.

11. Liquid insecticide dispensing apparatus for livestock and the like as defined in claim 1 in which the hollow member is a tube of rubber material and the second member has a cylindrical surface of smaller diameter than the inner diameter of the rubber tube, and further wherein the sealing is accomplished by the use of an annular sealing member positioned between the said two members.

12. Liquid insecticide dispensing apparatus for livestock and the like as defined in claim 6 in which there is provided a small air inlet between the screen and the inlet of the member having the capillary bore to thereby provide for elimination of "air lock" in the apparatus.

13. Liquid insecticide dispensing apparatus for livestock and the like as defined in claim 1 wherein the gradually reduced area forms in said hollow member an annular space for sediment and the like.

References Cited in the file of this patent

UNITED STATES PATENTS

| Number | Name | Date |
|---|---|---|
| 640,079 | Bangs | Dec. 26, 1899 |
| 736,895 | Watters | Aug. 18, 1903 |
| 752,175 | Monnier | Feb. 16, 1904 |
| 1,074,759 | Van Sickel | Oct. 7, 1913 |
| 1,129,977 | Hagny | Mar. 2, 1915 |
| 1,657,196 | Brinton | Jan. 24, 1928 |
| 1,941,613 | McDonell | Jan. 2, 1934 |
| 1,957,829 | Greenwald | May 8, 1934 |
| 1,999,123 | Clark et al. | Apr. 23, 1935 |
| 2,401,665 | Shick | June 4, 1946 |
| 2,501,593 | Becker | Mar. 21, 1950 |
| 2,533,907 | Anderson | Dec. 12, 1950 |
| 2,641,225 | Kirk | June 9, 1953 |
| 2,645,099 | Cumming | July 14, 1953 |
| 2,667,859 | Murray et al. | Feb. 2, 1954 |
| 2,669,969 | Rasmussen | Feb. 23, 1954 |